Nov. 6, 1934.    C. L. REED    1,979,772
ANTISKID DEVICE
Filed July 12, 1933
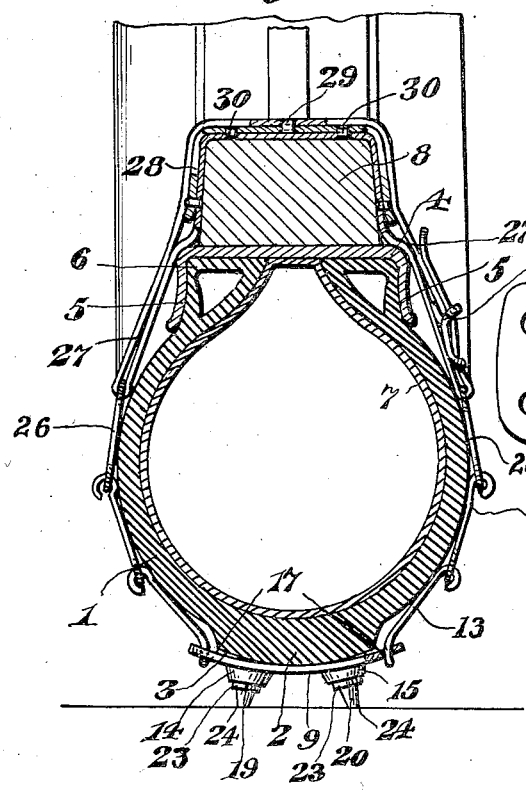
Inventor
Charles L. Reed,
By Geo. P. Kimmel.
Attorney Patented Nov. 6, 1934

1,979,772

UNITED STATES PATENT OFFICE 1,979,772

ANTISKID DEVICE

Charles L. Reed, Corning, N. Y.

Application July 12, 1933, Serial No. 680,120

4 Claims. (Cl. 152—14)

This invention relates in general to an antiskid device, and more particularly has reference to a combination of tread parts and retainer parts therefor adapted to be placed about a pneumatic tire to keep it from slipping or skidding on whatever surface it may be placed.

Heretofore chains have been employed both as treads and as retainers or holders for the treads. Plates having integral lugs projecting from their outer surfaces have also been used for treads while in other instances plates have been made sufficiently thick to support separate lugs or caulks threaded into the same. The chain treads and the integral lug treads however, have been found to wear very rapidly and to require replacement in a very short time. The separate lugs may of course be easily replaced when worn, but it has been found necessary, in order to support such lugs by threading them into a plate, to make the plate of such thickness as to be impracticable. In the past also, such lugs have been placed on a plate having substantially the same curvature as the surface of the tire, and the lugs have been placed adjacent the edges of the tread of the tire and at a considerable angle to the direction in which the weight is exerted on them. This has resulted in the lugs wearing smooth on their ends and being so far from the central plane of the tire that when the tire starts skidding it will not ride up on either lug to cause it to dig in and stop the skid.

It is therefore the object of this invention to provide a device of the type set forth having removable lugs without the necessity for a heavy plate such as was previously necessary. It is a further object to position these lugs and to shape the plates which support them so that the lugs will wear at a slight angle at their ends thus forming one sharp edge on each lug and so that when a force is exerted tending to cause the tire to skid, the tire will ride up on at least one lug and will simultaneously cause the sharp edge of the worn surface of the lug to dig in and prevent the skid. Furthermore, it is an object to provide a novel plate support for said lugs such that at least one lug shall be in contact at all times with the surface upon which the tire is running, while at the same time providing for the minimum number of supporting plates. Yet another object is to provide a fastening means for such device which may be easily secured in place and moved to closed position, and which will be automatically retained in closed position by the strain upon it.

With the above and other objects in view, this invention consists of a device such as shown by way of illustration and example in the accompanying drawing in which:

Figure 1 is a sectional view through a pneumatic tire and the coacting portion of a vehicle wheel, illustrating one embodiment of this invention mounted thereon.

Figure 2 is a plan view of one of the tread members of this invention.

Figure 3 is an enlarged sectional view illustrating the manner in which the removable lugs are secured to their support plate.

Figure 4 is a partial side view of a tire illustrating one means of securing the tread members on the tire.

Figure 5 is an enlarged view showing a device for securing together the ends of the side chains shown in Figure 4.

This invention is adapted for use in connection with a tire 1 which may be of pneumatic or other desirable construction. This tire is provided with a conventional tread portion 2 having its tread surface 3 of slightly convex contour. The tire 1 is mounted on a rim 4 having side flanges 5 for receiving the beads 6 of the tire. The tire is provided with a conventional inner tube 7. The rim is mounted on the felly 8 of a wheel, the tire being mounted on the rim and the rim on the felly in the customary manner.

The tread members of this invention each consist of a plate 9 in the form of an S-curve or ogee curve the bends forming oppositely offset portions 10 and 11 out of line with the ends. This plate is formed adjacent each end with a pair of holes 12, for the purpose of receiving a pair of links 13. Intermediate its ends and offset from each other on the oppositely offset portions 10 and 11 of the plate 9 there are formed a pair of outstanding bosses 14 and 15. These bosses are each formed with a tapped opening 16 extending almost to the inner surface 17 of the plate for the purpose of receiving the threaded portion 18 of the respective caulks or lugs 19 and 20. Adjacent its outer end the opening 16 is formed with a tapered countersink 21 adapted to receive the tapered shank 22 of the respective lugs. Each lug is formed with a squared head 23 which normally lies closely adjacent the outer surfaces of the bosses, by which a wrench or pliers may be applied for the purpose of inserting or removing the lug from the supporting plate 9.

The plate 9 may be formed of a stiff durable metal and receives practically no wear, substantially all the wear being taken up by the lugs 19 and 20. The plate is of a thickness only sufficient to enable it to retain its shape, the bosses 14 and 15 being of greater thickness than the plate itself and providing sufficient thickness for the support of the lugs. In this respect it is to be noted that both the weight of the vehicle and the sideward thrust exerted on the lugs or caulks will be taken up by the conical countersunk portion of the lug, thus relieving the threads and the threaded portion of the shank from a great deal of the strain which would otherwise be placed upon them. This enables the use of a thinner plate and boss than would otherwise be required and thereby renders the device less expensive and lighter without decreased efficiency. At the same time it greatly reduces the danger of stripping or breaking off the threaded portions 18 of the lugs.

The plate itself is formed with a curvature of a slightly greater radius than the curvature of the tread surface 3 of the tire, so that when a lateral force is exerted tending to cause the car to skid, the tire may roll sideways slightly on the plate and ride up on one of the lugs, thus causing it to dig in more firmly and prevent the skid. Furthermore, due to the curvature of the plate, the lugs 19 and 20 will be disposed at a slight angle outwardly with respect to each other. The lugs will therefore each wear on a slight angle so as to always have a relatively sharp outer edge 24. When the tire rolls as just described it will naturally cause this sharp edge portion 24 to dig in and positively prevent the skid.

The purpose of forming the plate into an S shape and offsetting the lugs in opposite directions on opposite bends of the plate is so that it will be possible to space the plates farther apart on the tread of the tire and use fewer plates without increasing the distance between successive lugs on successive plates. Thus, in the form shown, if the lug 20 were the latter of the two lugs on the plate 9 to contact the ground or other surface, then the next lug to contact the ground would be the lug 19 on the next plate 9. If these lugs were not offset on their respective plates, there would be sufficient room between them so that the lugs on one plate would leave the ground before the lugs on the next plate came in contact with the ground. Furthermore, this shape of plate is light and yet due to its great effective width possesses great resistance to being tilted or rolled over on the tread of the tire by force exerted on the lugs.

The tread members are held in place by means of the links 13, which are in turn connected to the links 25 and 26. The link 26 forms a loop for the purpose of receiving a flexible band 27 which passes around the felly 8 of the wheel. In order to prevent the band 27 from slipping on the felly, and to insure perfect positioning for the tread members, there is provided a rigid U-shaped member 28 which is riveted by means of a rivet 29 to the outer layer of the band 27 and by means of rivets 30 to the inner layer of this band. This fixes the distance between one of the links 26 and the U-shaped member 28 which fits around the felly of the wheel. The opposite end of the band 27 is passed through the other link 26 and the band secured together by means of a buckle 31. It will readily be seen that when the band 27 is drawn taut and buckled, the plate 9 will be positively positioned on the tread of the tire.

It will be understood that the tread members may likewise be held in place by side chains 32 disposed along the sides of the tire and secured to the links 25 as shown in Figure 4. In this instance it is unnecessary to have the band 27 passing around the felly of the wheel, although it may of course be employed if found necessary. For the purpose of securing together the ends of the side chains 32, there is provided a latching means consisting of a curved arm 33 having a hook 34 formed at one end thereof adapted to hook into a link at one of the ends, and a second curved locking arm 35 pivoted to the end 36 which is opposite the hook 34. The arms 33 and 35 are each cut away adjacent the pivot 36, and the pivot is formed without projections so as to provide a joint which will pass through a link of the chain 32. The arm 35 is curved to fit the curvature of the arm 33 as shown, and is provided with an opening 37 therethrough, which when the arms are together, will be offset from a line between the hook 34 and the pivot 36 in such a direction that a pull on the hook and a link inserted through the opening 37 will tend to hold the arms against each other. A link 38 on the opposite end of the chain 32 from that engaged by the hook 34, is passed through the hole 37.

When it is desired to join the two ends of the chain 32 together, the arms 33 and 35 are opened up and the hook 34 engaged with the link at the opposite end of the chain. The arm 35 is then pivoted about the link 38 and the pivot 36 until the two arms lie against each other. At this position, as explained, a pull on the chain will tend to hold the arms 33 and 35 together and prevent the fastener from being disengaged.

It will be appreciated that a novel and efficient means has been set forth for carrying out all the objects of this invention. Various changes in details of construction and arrangements of parts may be made without departing from the spirit or scope of this invention as set forth in the appended claims.

What I claim is:—

1. In an anti-skid device for a tire, an anti-skid element comprising a relatively thin curved plate with a smooth inner face having its radius of curvature greater than that of the tread of the tire with which it is to be associated, said plate having its ends provided with laterally spaced means for receiving a securing device therefor and having a part adjacent one end offset to one side of its longitudinal median in one direction along the tread surface of the tire and a second part adjacent its other end offset to the other side of its longitudinal median in the other direction along the tread surface of the tire, each of said offset parts being formed with an outwardly projecting boss on its outer surface positioned adjacent the extreme edge of the offset part, each of said bosses being formed with a socket terminating short of the inner face of the plate, the inner portion of the wall of the latter being threaded and the outer portion of said wall being of frustro-conical shape with the larger end adjacent the outer surface of the boss and a tread member formed of an inner, an outer, and an intermediate part, the latter extending laterally beyond said other parts and bearing against the outer surface of the enlargement, said inner part conforming in contour to the shape of the socket and threadedly engaging with the wall of the latter, and said outer part being of frustro-conoidal contour and projecting from said enlargement, said last mentioned parts projecting at slightly divergent angles with respect to the central plane of the tire tread and extending in the direction of said plane beyond all other parts of the device, whereby said tire will be supported solely by said offset frustro-conoidal part.

2. In an anti-skid device for a tire, an anti-skid element, and means for holding said element in place on the tread of a tire, said element comprising an S-shaped plate having portions adjacent its opposite ends offset in opposite directions from a straight line drawn between its ends, said plate having means at its opposite ends for receiving portions of said means for holding the element in place, one surface of said plate being smooth and adapted to engage the tread surface of the tire, and the other surface being formed with outwardly projecting socketed bosses adjacent the extreme outer edges of said offset portions respectively, said sockets each having the inner portion thereof threaded and the outer portion thereof countersunk with a frustro-conoidal countersink, and an anti-skid lug having a threaded portion and a portion to snugly fit such countersink anchored in each enlargement, said plate having a curvature of greater radius than the curvature of the tread surface of said tire, and said anti-skid lugs extending outwardly at opposite inclinations with respect to the central plane of the tire tread, and beyond all other parts of the device whereby said tire will be supported solely by said lugs mounted in said offset portions of the plate.

3. In an anti-skid device for a tire, an anti-skid element, and means for holding said element in place on the tread of a tire, said element comprising a relatively thin plate having laterally spaced means at its opposite ends for receiving portions of said means for holding the element in place, one surface of said plate being smooth and adapted to engage the tread surface of the tire and the opposite surface being formed with outwardly projecting enlargements adjacent its opposite ends and on opposite sides of the central plane of the tire tread, and an anti-skid lug having a shank countersunk into and removably anchored within each enlargement and a tread portion projecting outwardly from such enlargement, said tread portions being inclined at divergent angles with respect to the central plane of the tire and extending beyond all other parts of the device, and the outer tread surfaces of said tread portions being substantially normal to the central plane of the tire tread and at an acute angle to the respective axes of the tread portions, whereby the outer edges of said tread surfaces will always be sharp.

4. In an anti-skid device for a tire, an anti-skid element, and means for holding said element in place on the tread of a tire, said element comprising a relatively thin plate having laterally spaced means at its opposite ends for receiving portions of said means for holding the element in place, the outer surface of said plate being formed with outwardly projecting enlargements adjacent its opposite ends and on opposite sides of the central plane of the tire tread, and an anti-skid lug having a shank countersunk into and removably anchored within each enlargement and a tread portion projecting outwardly from such enlargement, said plate having a curvature of greater radius than the curvature of the tread surface of said tire, and said anti-skid lugs extending outwardly at opposite inclinations with respect to the central plane of the tire tread beyond all other parts of the device, and the outer tread surfaces of said tread portions being substantially normal to the central plane of the tire tread and at an acute angle to the respective axes of the tread portions whereby the outer edges of said tread surfaces will always be sharper than the inner edges.

CHARLES L. REED.